United States Patent Office 3,342,865
Patented Sept. 19, 1967

3,342,865
N,N'-DIALKYL-N-PHENYL-N'-ISOPROPYL-PARA-PHENYLENEDIAMINES
Arthur E. Oberster, North Canton, Ohio, assignor to The Firestone Tire & Rubber Company, Akron, Ohio, a corporation of Ohio
No Drawing. Filed Mar. 2, 1964, Ser. No. 348,808
5 Claims. (Cl. 260—576)

This invention relates to N,N'-dialkyl-N-phenyl-N'-isopropyl-para-phenylenediamines.

N - phenyl - N'-isopropyl-para-phenylenediamine (referred to herein as IPPD) is offered on the market under several different trade names. However, it has several drawbacks, one of the chief of which is a tendency to irritate and sensitize the skin of those who work with it, and though originally used to a considerable extent as a rubber antiozonant, it is less used at this time because of its toxicity.

It has been found that the N,N'-lower-alkyl derivatives of IPPD are non-toxic, and the invention pertains to their use, and more particularly the use of the diethyl and dipropyl derivatives, as antiozonants in diene hydrocarbon-rubbers including natural rubber, butadiene-styrene copolymer, polybutadiene, polyisoprenes, isoprene-butadiene copolymer, etc.

There are different methods of preparing the new compounds. The following examples are illustrative:

EXAMPLE 1

The following materials were placed in a flask and stirred vigorously for 20 hours:

| | |
|---|---|
| IPPD _____g__ | 100 |
| Conc. HCl _____ml__ | 310 |
| Water _____ml__ | 50 |

The reaction mixture containing the dihydrochloride of IPPD, was then filtered and the salt washed with ether and dried.

The following materials were placed in a glass-lined bomb and heated at 154° C. for about 5 hours with shaking:

| | |
|---|---|
| IPPD.2HCl _____g__ | 116 |
| Methanol _____ml__ | 100 |

The reaction mixture was then cooled, dissolved in chloroform, neutralized with sodium bicarbonate solution, washed with water and dried over sodium sulfate. The chloroform was removed leaving a dark viscous oil weighing 120 grams. The oil was only partially soluble in petroleum ether. The petroleum-ether soluble material (about 100 g.) was chromatographed on about 400 g. of alumina. The first eluates (petroleum ether) were yellow oils. Several of these early fractions crystallized and melted at 58–60° C. This was N,N'-dimethyl-N-phenyl-N'-isopropyl-para-phenylenediamine which after several recrystallizations from methanol had a melting point of 59–60° C. The infra-red spectrum on the compound showed no —NH bands indicating that the nitrogens are completely substituted. Calculated analysis for $C_{17}H_{22}N_2$, N—11.02; found, N—10.82.

Later eluates gave monomethyl IPPD with a melting point of 68–70° C. This compound does show an —NH band in the infra-red spectrum at 2.9μ.

EXAMPLE 2.—PREPARATION OF N,N'-DIETHYL IPPD

The diethyl derivative of IPPD was prepared by reaction of IPPD with ethyl phosphate, according to the following equation:

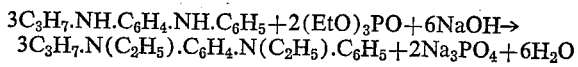

The materials used were:

| | |
|---|---|
| IPPD _____g__ | 67.8 |
| Triethyl phosphate _____g__ | 36.4 |
| NaOH _____g__ | 25.0 |
| Water _____ml__ | 100 |

The amine and phosphate were refluxed for 4 hours. Then the sodium hydroxide dissolved in the water was added and the reaction mixture was heated for another hour.

The reaction mixture was cooled and filtered. The filtrate was extracted with several portions of ether, the ether extracts combined, dried over sodium sulfate and evaporated, leaving a dark viscous oil which was chromatographed on about 400 grams of alkaline aluminum. The petroleum ether eluates contained an oil which would not crystallize. The infra-red spectrum on this oil showed no —NH bands indicating complete substitution. Calculated analysis for $C_{19}H_{26}N_2$, N—9.92; found, N—9.52.

EXAMPLES 3 AND 4

The N,N'-di-n-propyl and N,N'-di-n-butyl IPPDs were obtained by reaction of IPPD.2HCl with the respective alcohols.

EXAMPLE 3.—ANALYSIS FOR N,N'-DI-n-PROPYL PPD

| | Calc. for $C_{21}H_{30}N_2$ | Found |
|---|---|---|
| C | 81.24 | 81.05 |
| H | 9.73 | 9.90 |
| N | 9.02 | 9.02 |

EXAMPLE 4.—ANALYSIS FOR N,N'-DI-n-BUTYL PPD

| | Calc. for $C_{23}H_{34}N_2$ | Found |
|---|---|---|
| C | 81.6 | 81.07 |
| H | 10.13 | 10.29 |
| N | 8.28 | 8.33 |

The dimethyl and diethyl IPPDs were incorporated in the following GR–S tread stock.

GR–S compounding formula

| | Parts by weight |
|---|---|
| GR–S _____ | 100.0 |
| HAF Black _____ | 50.0 |
| Softener _____ | 5.0 |
| Zinc oxide _____ | 3.0 |
| Stearic acid _____ | 3.0 |
| Antioxidant A [1] _____ | 2.2 |
| Antioxidant B [2] _____ | 0.4 |
| Wax _____ | 3.0 |
| Total _____ | 166.6 |

[1] 2,2,4-trimethyl-6-dodecyl-1,2-dihydroquinoline.
[2] Antioxidant A plus N,N'-diphenyl-p-phenylenediamine.

The masterbatch was compounded as follows:

| | GR–S Test Stocks | | |
|---|---|---|---|
| | Blank Control | IPPD Control | Test Stocks |
| Masterbatch | 166.6 | 166.6 | 166.6 |
| Sulfur | 2.0 | 2.0 | 2.0 |
| Accelerator | 1.1 | 1.1 | 1.1 |
| IPPD | 0 | 2 | 0 |
| Dialkyl IPPDs | 0 | 0 | 2 |

The stocks were cured 60 minutes at 280° F.

The stocks were subjected to the usual physical tests, before and after aging 2 days in an air-circulating oven at 212° F. They were also subjected to an accelerated ozone weathering test.

Ozone test

In the static ozone test, each stock was aged 7 hours at 95° F. in 60 p.p.m. ozone. In the dynamic ozone test, each stock was aged 14 hours at 95° F. in 60 p.p.m. ozone. The apparatus and method of test followed that described in the article by Ford and Cooper entitled "A Study of the Factors Affecting the Weathering of Rubber-Like Materials—I and II" in India Rubber World 124, 696 (September 1951) and 125, 55 (October 1951). In grading the results, the larger numbers represent the most deterioration.

The results of the various tests are recorded below.

RESULTS OF TESTS IN GR-S TREAD STOCK

| Antiozonant | None | IPPD | Me₂ IPPD | Et₂ IPPD |
|---|---|---|---|---|
| Ozone Weathering Test: | | | | |
| Static | 0 | 0 | 0 | 0 |
| Dynamic | 5 | 1 | 3 | 1 |
| Normal Physical Properties: | | | | |
| 300% modulus, p.s.i | 1,600 | 1,525 | 1,475 | 1,300 |
| 400% modulus, p.s.i | 2,450 | 2,425 | 2,300 | 2,050 |
| Tensile strength, p.s.i | 3,200 | 3,400 | 3,400 | 3,225 |
| Elongation, percent | 490 | 520 | 540 | 560 |
| Physical Properties After Aging: | | | | |
| 300% modulus, p.s.i | | 2,525 | 2,625 | 2,500 |
| Tensile strength, p.s.i | 2,750 | 3,025 | 2,700 | 2,825 |
| Elongation, percent | 280 | 350 | 310 | 330 |

In the tests recorded in the following table, test samples were used which contained the antiozonants of Examples 2, 3 and 4, identified as Et₂IPPD, n-Pr₂IPPD and n-Bu₂IPPD. The test pieces were subjected to an atmosphere containing 60 parts of ozone per hundred million parts thereof at 95° F. for 14 hours. During 50 minutes of each hour the samples were simply elongated 12½ percent without flexing, and during the remaining 10 minutes they were flexed while elongated 20 percent. (Test described in Willis, Alliger and McFadden, "Antiozonants in Tire Sidewalls," pages 39–44 of Chemistry in Canada, November 1959.)

RESULTS OF TESTS IN GR-S TREAD STOCK

| Antiozonant | None | Et₂ IPPD | n-Pr₂ IPPD | n-Bu₂ IPPD |
|---|---|---|---|---|
| Ozone Weathering Test: | | | | |
| Static-dynamic | 3 | 2 | 2 | 2 |
| Normal Physical Properties: | | | | |
| 300% modulus, p.s.i | 1,725 | 1,500 | 1,575 | 1,600 |
| 400% modulus, p.s.i | 2,600 | 2,450 | 2,400 | 2,450 |
| Tensile strength, p.s.i | 3,600 | 3,425 | 3,575 | 3,275 |
| Elongation, percent | 530 | 530 | 540 | 510 |
| Physical Properties After Aging: | | | | |
| 300% modulus, p.s.i | | 3,050 | 3,025 | 2,850 |
| Tensile strength, p.s.i | 2,950 | 3,050 | 3,025 | 2,850 |
| Elongation, percent | 270 | 300 | 300 | 300 |

The results show that none of the added materials had an appreciable adverse effect on the physical properties. The dimethyl IPPD showed little improvement in antiozonant properties over the blank. The diethyl IPPD was substantially as good as the unreacted IPPD. The di-n-propyl and diisopropyl IPPDs are as good as, or better than diethyl IPPD. An improvement not reflected in the foregoing results is the freedom of the dialkyl IPPDs from adverse skin reactions encountered with IPPD.

The comparative toxicities of three commercial IPPD samples and samples of dimethyl-IPPD and diethyl-IPPD, prepared as above, were determined by means of the "Patch Test" technique substantially as described in Occupational Diseases of the Skin, Schwartz, Tulyson and Peck, 2nd ed., Lea & Febiger, 1947, pages 54–64. The test was modified as follows: The chemicals were applied in 5 percent solutions of cold cream and Vaseline on ½-inch square contact material (guaze) using fifteen subjects for each test. The patches were applied and kept on for 48 hours, then taken off and the irritation produced was rated. After 7 to 10 days the patches were applied for 48 hours and again removed. Irritation reactions are those which gave a reaction with the first application. Sensitization reactions are those which do not necessarily cause irritation on first contact but effect specific changes in the skin such that, after five to seven days or more, further contact on the same or other parts of the body causes dermatitis, and if there was irritation on the first contact, a sensitization reaction will be evidenced by an increase in severity of the reaction.

In reporting the reactions, they were graded as follows:

+ erythema on patch area
++ erythema and edema at patch area
+++ erythema, edema, papules and a few vesicles at patch area
++++ erythema, edema, many vesicles and, in some cases, ulceration at patch area.

The results of tests on fifteen persons for each reaction are recorded in the following table, in which the three commercial IPPD compositions are called IPPD–A, IPPD–B and IPPD–C for comparison with N,N'-dimethyl-N-phenyl-N'-isopropyl-p-phenylenediamine and N,N'-diethyl-N-phenyl-N'-isopropyl-p-phenylenediamine, the test materials, designated Me₂IPPD and Et₂IPPD. The abbreviation "Neg." is used in indicating the number of negative reactions (no effect of any kind produced on the skin).

| | IPPD-A | IPPD-B | IPPD-C | Me₂ IPPD | Et₂ IPPD |
|---|---|---|---|---|---|
| Irritation Reaction: 5% Cold Cream | 2+++<br>1++<br>3+<br>9 Neg. | 1+++<br>1++<br>3+<br>10 Neg. | 1+++<br>2++<br>5+<br>7 Neg. | 15 Neg. | 15 Neg. |
| Sensitization Reaction: 5% Cold Cream | 2+++<br>2++<br>11 Neg. | 2+++<br>3++<br>5+<br>5 Neg. | 1+++<br>5++<br>4+<br>5 Neg. | 1++<br>14 Neg. | 15 Neg. |

The very high rating for the dimethyl-IPPD and diethyl-IPPD make them entirely acceptable for commercial use. The diethyl-IPPD is a good antiozonant for cured diene-hydrocarbon rubbers.

What I claim is:
1. N,N' - dialkyl - N - phenyl - N' - isopropyl - para-phenylenediamines in which the alkyl groups contain 1 to 4 carbon atoms.
2. N,N' - dimethyl - N - phenyl - N' - isopropyl - para-phenylenediamine.
3. N,N' - diethyl - N - phenyl - N' - isopropyl - para-phenylenediamine.
4. N,N' - di - n - propyl - N - phenyl - N' - isopropyl-para-phenylenediamine.
5. N,N' - di - n - butyl - N - phenyl - N' - isopropyl-para-phenylenediamine.

References Cited
UNITED STATES PATENTS 3,290,376  12/1966  Chenicek et al. _ _ _ _ _ _ 260—576

CHARLES B. PARKER, *Primary Examiner.*
R. V. HINES, *Assistant Examiner.*